United States Patent
Olson

(10) Patent No.: US 8,270,346 B2
(45) Date of Patent: Sep. 18, 2012

(54) DYNAMIC CALL ANCHORING

(75) Inventor: Timothy S. Olson, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1137 days.

(21) Appl. No.: 12/106,558

(22) Filed: Apr. 21, 2008

(65) Prior Publication Data

US 2009/0262733 A1 Oct. 22, 2009

(51) Int. Cl.
*H04W 4/02* (2009.01)

(52) U.S. Cl. .................................................... 370/328

(58) Field of Classification Search .................. 370/328; 455/416, 436–444

See application file for complete search history.

(56) References Cited

U.S. PATENT DOCUMENTS

| | | |
|---|---|---|
| 6,973,308 B1 | 12/2005 | Smith |
| 2006/0105770 A1* | 5/2006 | Jagadeesan et al. .......... 455/444 |
| 2006/0121891 A1* | 6/2006 | Jagadeesan et al. .......... 455/417 |
| 2007/0121596 A1 | 5/2007 | Kurapati et al. |
| 2007/0206569 A1* | 9/2007 | Silver et al. .................... 370/352 |
| 2007/0248079 A1 | 10/2007 | Jayaram et al. |
| 2007/0265003 A1 | 11/2007 | Kezys et al. |
| 2008/0090570 A1* | 4/2008 | Deshpande et al. .......... 455/436 |
| 2008/0144637 A1* | 6/2008 | Sylvain et al. ................. 370/401 |
| 2008/0205386 A1* | 8/2008 | Purnadi et al. ................. 370/389 |
| 2008/0254797 A1* | 10/2008 | Achtari et al. ................. 455/436 |
| 2009/0036128 A1* | 2/2009 | Raguparan et al. ........... 455/436 |

OTHER PUBLICATIONS

International Search Report—2 pgs., Jun. 16, 2009, AGITO Networks, Inc.
PCT Written Opinion—8 pgs., Jun. 16, 2009, AGITO Networks, Inc.

* cited by examiner

*Primary Examiner* — Hassan Kizou
*Assistant Examiner* — Charles C Jiang
(74) *Attorney, Agent, or Firm* — Tarolli, Sundheim, Covell & Tummino LLP

(57) ABSTRACT

A system for dynamically anchoring a call initiated by a mobile unit can include call anchor logic programmed with anchoring criteria to determine if a new outbound call being initiated from the mobile unit should be anchored at an anchor point located outside of a service provider network for the mobile unit based on application of the anchoring criteria to input data. The call anchor logic provides an anchor control signal to cause the outbound call to be one of (i) anchored at the anchor point and (ii) connected to a called party without anchoring at the anchor point. Memory that stores the input data, the memory being accessible by the call anchor logic.

32 Claims, 7 Drawing Sheets

DYNAMIC CALL ANCHORING

TECHNICAL FIELD

The present invention relates generally to communications and, more particularly, to a system and method to dynamically anchor a wireless communications call session.

BACKGROUND

Fixed and mobile convergence (FMC) solutions are being developed to enable substantially seamless interoperability of different communication technologies and platforms. To this end many wireless devices are being manufactured to support services using more than one type of wireless communication technology. For example, portable electronic devices, such as cellular telephones, laptop computers and personal digital assistants, can include interfaces that enable operation using cellular technologies, wireless local area network (WLAN) technologies, and/or Bluetooth technologies to name a few.

As a further example, many enterprise networks support voice over internet protocol (VoIP) that can run over one or more wireless networks. For instance, WiFi voice networks currently support VoIP and, with little integration, with a wider area voice network, such as cellular networks.

SUMMARY

The invention relates generally to a system and method to dynamically determine whether to anchor a call from a mobile unit.

One aspect of the invention provides a system for dynamically anchoring a call initiated by a mobile unit. The system can include call anchor logic programmed with anchoring criteria to determine if a new outbound call being initiated from the mobile unit should be anchored at an anchor point located outside of a service provider network for the mobile unit based on application of the anchoring criteria to input data. The call anchor logic provides an anchor control signal to cause the outbound call to be one of (i) anchored at the anchor point and (ii) connected to a called party without anchoring at the anchor point. Memory that stores the input data, the memory being accessible by the call anchor logic.

Another aspect of the invention provides a system to control anchoring an outbound call from a mobile unit within a predetermined private network that is different from a service provider network for the mobile unit. The system includes means for applying preprogrammed call anchoring criteria to corresponding input data to determine whether anchoring is required for the outbound call from the mobile unit. The system also includes means, responsive to the application of the preprogrammed call anchoring criteria, for automatically controlling the mobile unit to one of (i) initiate the outbound call to the private network so as to be anchored within the private network and connected to a called party or (ii) initiate the call to the called party without anchoring within the private network.

Yet another aspect of the invention provides a method for anchoring a call from a mobile unit at an anchor point located in a private network. The method includes initiating a call from the mobile unit to a dialed number for a called party and applying call anchoring criteria to a set of input data to determine if anchoring the call from the mobile unit is required. The call is anchored at the anchor point in the private network if the application of the call anchoring criteria indicates that anchoring of the call is required. The call is connected to the called party without anchoring the call in the private network if the application of the call anchoring criteria indicates that anchoring of the call is prohibited.

Still another aspect of the invention provides a mobile unit that includes a first wireless interface configured to provide for bidirectional communication over a first radio technology and a second wireless interface configured to provide for bidirectional communication over a second radio technology, the first radio technology being different from the second radio technology. A processor controls operation of the first wireless interface and the second wireless interface. The processor also executes instructions to perform a method of dynamically controlling whether a call initiated using the first wireless interface requires anchoring in an associated private network, which method includes:
  applying call anchoring criteria to determine whether anchoring the call from the mobile unit is required;
  calling an enterprise number using the first wireless interface to anchor the call at an anchor point in the associated private network if the application of the call anchoring criteria indicates that anchoring of the call is required; and
  connecting the call to the called party without anchoring the call in the associated private network if the application of the call anchoring criteria indicates that anchoring of the call is one of not required and prohibited.

Yet another aspect of the invention provides a private network that includes an internet protocol private branch exchange (IP PBX) in communication with a public network through a gateway, the IP PBX defining a node in the private network. A server is programmed to perform a method of dynamically controlling anchoring within the private network of a call from an authorized mobile unit to a called party, the method comprising:
  causing the authorized mobile unit to anchor the call in the private network if application of anchoring criteria to variable input data indicates that call anchoring is required for the call; and
  causing the authorized mobile unit to connect the call to the called party without anchoring within the private network if application of anchoring criteria to variable input data indicates that call anchoring is one or prohibited or not required for the call.

Still a further aspect of the invention includes a system that includes at least one device that is configured to cause an outbound call to be dynamically anchored within a private network for connecting to a called party if decision logic determines that at least one preprogrammed criteria indicates that the outbound call is to be anchored within the private network, the decision logic causing the outbound call to be directly connected to the called party without anchoring if the at least one preprogrammed criteria indicates that anchoring of the outbound call within the enterprise is prohibited. The private network is accessible from and operating outside a service provider network.

DETAILED DESCRIPTION

Figure 1:
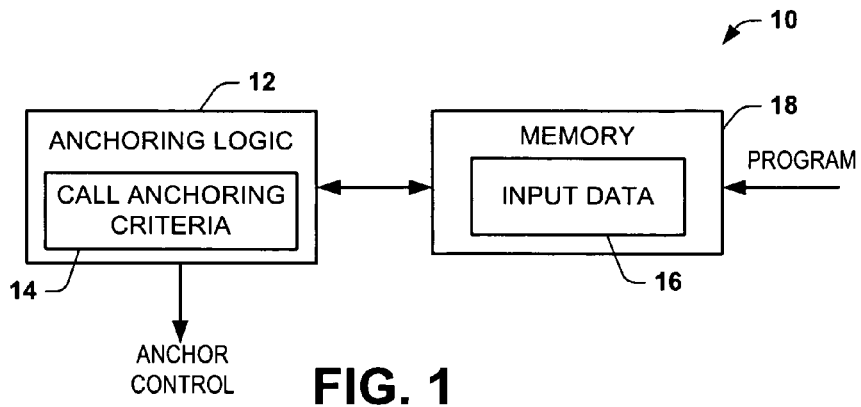
FIG. 1 is a simplified of a system configured to perform dynamic call anchoring according to an aspect of the invention.

The invention relates generally to dynamically anchoring an outbound call from a mobile unit within a private network. For instance, call anchoring decision logic can automatically (without user intervention) determine whether or not to anchor the outbound call based on application of anchoring criteria to a set of corresponding input data. The input data can represent call data (e.g., the dialed number or other user input), a condition of the enterprise equipment, a designation of the called party, a location of the mobile unit. A manual control can also be utilized to override other criteria employed by the call anchoring decision logic. As a result, the call anchoring decision logic causes the outbound call to either be anchored within network equipment (e.g., an enterprise PBX or other anchor point) and then connected to the called party or be connected to the called party without anchoring within the private network.

The private network can correspond to any network that is located and/or operates outside of a service provider network for the mobile unit. For example, the mobile unit can subscribe to a mobile service plan for operation over a Public Land Mobile Network (PLMN). The private network can be enterprise network (e.g., for an organization or business entity), an independent VoIP operator (e.g., a VoIP service provider, such as Vonage or the like) or a personal network (e.g., a home-based network). As one example, the private network includes equipment that is configured to anchor a call within the private network, such as for a call made to one or more predefined access number. The call anchoring decision logic can reside in the mobile unit, the private network or it can be distributed through a combination of the mobile unit and the private network.

As will be appreciated by those skilled in the art, portions of the invention, including the call anchoring decision logic, may be embodied as a method, data processing system, or computer program product. Accordingly, these portions of the invention may take the form of an entirely hardware embodiment, an entirely software embodiment, or an embodiment combining software and hardware. Furthermore, portions of the invention may be embodied as a computer program product on one or more computer-usable storage medium having computer readable program code on the medium (or media). Any suitable computer-readable medium may be utilized including, but not limited to, static and dynamic storage devices, hard disks, optical storage devices, and magnetic storage devices, which may reside at one location or be distributed among storage devices.

Certain embodiments of the invention are described herein with reference to flowchart and functional block diagrams of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer (or computers) or other programmable data processing apparatus to function in a particular manner, such that the instructions stored in the computer-readable memory result in an article of manufacture including instructions which implement the function specified in the block or blocks. The computer program instructions may also be loaded onto one or more computer or other programmable data processing apparatus or appliance to cause a series of operational steps to be performed on the computer or other programmable apparatus or appliance to produce a computer implemented process such that the instructions which execute on the computer or other programmable apparatus provide steps for implementing the functions specified in the flowchart block or blocks.

The invention relates to a system and method to anchor an outbound call placed from a mobile unit in a private network. In certain embodiments, the mobile unit can be configured to operate in any number of two or more different radio technologies, any of which may be utilized to anchor a call in the enterprise. In other embodiments, the mobile unit can be configured to operate using a single radio technology. As used herein, the term "radio technology" and variations of this term are intended to encompass any form of wireless communication that may be utilized to send, to receive or to send and receive audio signals (including voice signals), data signals or a combination of voice and data signals without requiring a hard-wired or other physical connection. Examples of different radio technologies include cellular telephones (e.g., 2G, 3G or 4G Global System for Mobile (GSM) technologies), personal communication system (PCS) communication technologies, wireless networks, (e.g., wireless local area networks (WLAN), such as WiFi; wireless metropolitan area networks (WirelessMAN), such as WiMax; and any variation and improvements thereof), satellites, Bluetooth, two-way (or half-duplex) radio, and any combinations thereof. Those skilled in the art will understand and appreciate that various standards and protocols exist and have yet to be developed to enable communication via these and other radio technologies. For example, the mobile unit can be implemented in any form of wireless technology, such as including a cellular telephone, personal digital assistant (PDA), a portable computer (e.g., a laptop computer, or tablet computer) and the like.

FIG. 1 depicts an example of a block diagram of a system 10 that can be employed to dynamically anchor a mobile unit within an enterprise according to an aspect of the invention. As used herein, the term "anchor" refers to a point or an operation within a private network operation where two call legs are connected together. In many examples described herein, the private network may correspond to an enterprise to which the mobile unit has been authorized; although the private network, more generally, can refer to any authorized network for the mobile unit that is located and/or operates outside of the service provider network for the mobile unit.

For example, assuming that the mobile unit initiates an outbound call that has been determined to require anchoring, the call is connected to equipment, such as a private branch exchange (PBX) of the private network or a Public Switched Telephone Network (PSTN) gateway or other equipment, during a first stage of the call. After the call is connected to the equipment, the called party is connected to the calling party over a second stage of the call placed from the equipment to the called party. The call is thus anchored at the enterprise equipment corresponding to the point where the two call legs are connected together.

As a further example, by anchoring a call on an enterprise PBX or other enterprise equipment, call switching functionality of the PBX can be utilized, such as to perform handover for a call between different radio technologies employed by the mobile unit. Additionally, anchoring a call on the PBX affords the use of other PBX functionality (e.g., hold, transfer, call forwarding, call parking, conference calling, and the like), access to enterprise features (e.g., enterprise voice mail access, enterprise caller line identity), as well as enterprise least cost routing of calls. Those skilled in the art will understand that the list of features that may be available if a call is anchored is not intended to be exhaustive and the set of features may vary based on the configuration and capabilities of a given enterprise.

While anchoring a call on the PBX (or other similar network equipment) may have several advantages, there are also some possible disadvantages, such as enterprise caller line identity for private calls and additional fixed line costs for two stage dialing. For instance, there are times when anchoring a call in the enterprise may cost more than making a direct cellular call. If the calling party is in the PLMN and the called party is not accessible via the private enterprise network then the call has an incoming fixed line call leg, and outgoing fixed line call leg, plus cost of the cellular call leg. Depending on the rates for each call leg, this combined cost for the two stage call may be more expensive than calling the party from the mobile unit directly without anchoring the call in the enterprise.

The system 10 determines whether to anchor an outbound call from a mobile unit within a private network, such as an enterprise, or to connect the call to the called party without anchoring the call within the private network. The anchoring can be considered dynamic since the input data and/or the call anchoring criteria being applied can vary for each outbound call. The system 10 includes anchoring logic 12 that is programmed with call anchoring criteria 14 that can be applied to input data 16 to determine if the outbound call should be anchored within a private network (e.g., an enterprise) to which the mobile unit belongs or has been authorized. The anchoring logic 12 provides an ANCHOR CONTROL signal with a value that indicates whether the outbound call requires anchoring. If it is determined that the call requires anchoring, responsive to the ANCHOR CONTROL signal, calling software at the mobile unit initiates the call to a predefined telephone number for the equipment that is configured to receive and anchor the call in the private network.

Those skilled in the art will appreciate various sources and types of information that can be provided as the input data 16 and criteria that can be utilized to ascertain whether a given outbound call should be anchored. The input data 16 can stored in the memory 18 in response to a program signal, such as can correspond to information provided by the mobile unit, by enterprise equipment (e.g., a server, gateway or the like) or from a combination of such sources.

As one example, the input data 16 can represent information associated with the called party, such as the telephone number dialed for the outbound call. The anchoring criteria can be programmed to provide means for analyzing at least a portion of the dialed number (e.g., a prefix, area code, country code and the like) to ascertain if the number has been pre-identified as a number that requires anchoring. Additionally or alternatively, the anchoring criteria (or associated calling software running in the mobile unit) can be programmed to recognize short digit dialing or extension dialing, such as for intra-enterprise calls. For short digit and extension dialing, for example, the call is required to be anchored to the enterprise PBX since the cellular network may not be capable of routing the call. It will be understood that 911 and 411 calls are but two examples of short digit calls that would not be anchored. Thus, for the example of an enterprise, the mobile unit can call a predetermined enterprise telephone number over the cellular network and the enterprise PBX can connect the mobile unit with the called party within the enterprise. Additionally, for long distance and international calls, call anchoring can be utilized to enable the enterprise PBX to send the call via voice over internet protocol (VoIP) running over a data network to reduce the cost associated with such calls. If the cellular call is anchored in an enterprise that is in the same calling area as the mobile device, for example, only cellular air-time is charged and long distance or international charges are not incurred.

As another example, the input data may also represent predefined information associated with the called party. For example, the mobile unit can include a contact list or address book that can include a programmable field associated with each contact or with each telephone number. This field can be programmed to indicate whether or not a call to such number requires anchoring within the enterprise. Thus, if a telephone number (or contact) is set to require call anchoring, the mobile unit will initiate each call to the called party by anchoring the call within the private network. For example, if an enterprise user calls a spouse or a relative there may be a desire to not route the call via the enterprise, such as for privacy reasons. The call anchoring field can be programmed by the user (e.g., at the mobile unit) or by an administrator in the private network.

The input data can also represent a condition associated with equipment in the private network, such as a failure of certain equipment that is necessary to anchor the call. For example, if an enterprise PBX experiences a catastrophic failure, such as a power outage, a mobile units operating in the cellular network could not make call if it was being anchored on the PBX. It is to be understood that there are a variety of circumstances when it may be desirable to ensure that a call is connected regardless of whether call anchoring has been required by the call anchoring logic 12 but call anchoring is not possible. An emergency situation (not a 911 call) is a one example where it is important that a call be connected whether it is anchored or not. In this or other similar situations, the calling software can be programmed to ensure that an outbound call is connected assuming that some mechanism is available to connect the call.

Additionally or alternatively, the input data 16 can represent a location of the mobile unit. In this embodiment, the call anchoring criteria 14 is programmed to determine if the mobile unit is located in a region or zone for which call anchoring is required. The region or zone can be identified a priori such as based on a known proximity of the mobile unit to the enterprise network. Alternatively, the region or zone can correspond to a path known to provide a line of travel that starts external to the network and terminates within the enterprise network. The location information can be determined from call data, such as cellular identifier (cell ID) or location area code (LAC), from global position system (GPS) data, or other beacons or information that can be utilized to ascertain a location of the mobile unit. The determined location can be compared to predetermined mapping or footprint data to determine whether anchoring should be required. The predetermined mapping data can be programmed by an administrator, the mapping data can be acquired from mobile units or the mapping data can be both programmed and learned from mobile units over time. The resulting mapping data thus can be updated intermittently for the call anchoring logic 12.

Because cost is an important consideration for a communication system, the input data 16 and call anchoring criteria may also be programmed to determine whether to anchor the outbound call according to a rate plan analysis for the dialed number. Thus, the call anchoring criteria 14 can determine that anchoring is required if the cost of anchoring the call is less than the cost of connecting the call without anchoring. Those skilled in the art will understand and appreciate various types of least cost routing algorithms that can be implemented as part of or otherwise used in the determination for dynamic call anchoring.

It will be further appreciated that the various mechanisms that can be implemented by the anchoring logic can be implemented individually or as any combination of two or more of such mechanisms. Additionally, certain criteria may be assigned a higher priority such that satisfaction of one or more anchoring criteria can have precedence over or override one or more different call anchoring criteria that have not been satisfied.

In the example of FIG. 1, the input data 16 is stored in memory 18, which can be implemented as volatile or non-volatile type of memory. Similar to as discussed above with respect to the anchoring logic 12, the memory 18 can reside at the mobile unit, at an server in the private network or other equipment, or the input data 16 can be stored in separate memory structures distributed across the mobile unit and the private network. The particular type of memory and the allocation or distribution of the anchoring logic and input data can be adjusted according to application and performance requirements.

Figure 2:
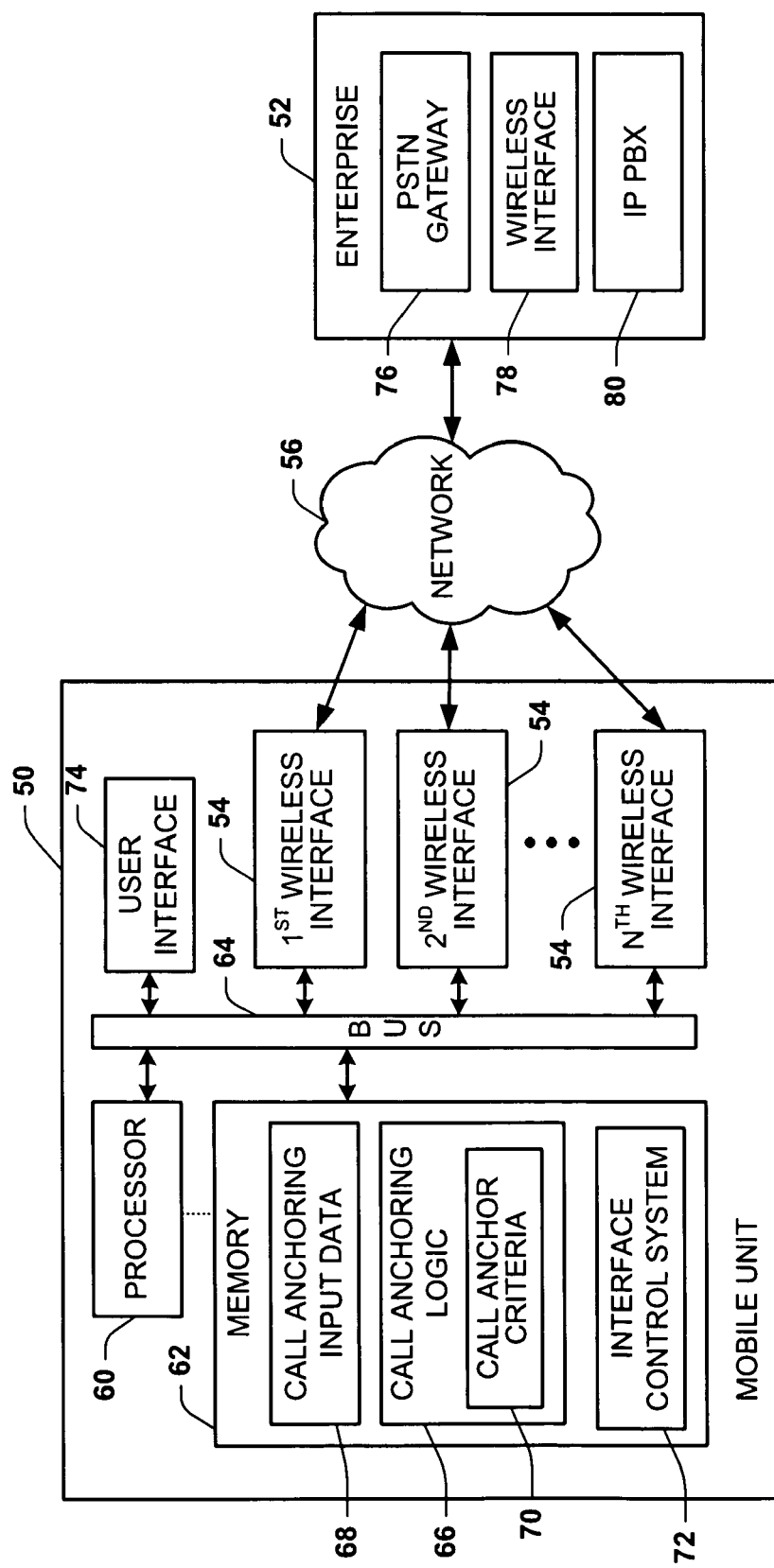
FIG. 2 depicts an example of a mobile unit configured to perform dynamic call anchoring according to an aspect of the invention.

FIG. 2 depicts an example of a mobile unit 50 that is configured to determine whether to anchor an outbound call within an associated enterprise 52 to which the mobile unit has been authenticated. As described herein, it will be understood and appreciated that the enterprise 52 could correspond to any type of private network (e.g., a corporate or organizational network infrastructure, which may be locally or globally distributed, a VoIP operator network, a home network or the like) to which the mobile unit belongs. The mobile unit 50 can be portable and thus can be carried or otherwise transported in space, such as by a user. The mobile unit 50 includes one or more wireless interface 54, which are indicated as a first wireless interface, a second wireless interface, and an Nth wireless transceiver, where N denotes the number of wireless interfaces (N≧1). Each of the wireless interfaces 54 can be configured for bi-directional operation to send and receive wireless signals via corresponding antennas (not shown). For receiving signals, each wireless interface 54 includes circuitry for demodulating and converting the received signals to an appropriate digital format for processing at the receiver as is known in the art. Each interface 54 may also include circuitry for converting data being provided from the mobile unit 50 and from modulating and performing frequency conversion of such data and for sending such data.

As a further example, the mobile unit 50 is configured to communicate using two or more different types of radio technologies operating according to respective wireless protocols. For example, the first wireless interface 54 can correspond to a cellular interface configured to communicate in an appropriate wireless telecommunications network (e.g., GSM or PCS) that is connected with the PSTN, schematically indicated at 56. The second wireless interface 54 can communicate in a first type of wireless network (e.g., WLAN, such as Wi-Fi), which is a different type of network than the network of the first interface. The Nth wireless interface can provide for bi-directional communication in yet a different type of wireless network (e.g., Bluetooth or WiMAN, such as WiMAX) from that associated with the first and second wireless interfaces. While many the examples described herein relate to multimode phones that can support voice over two or more wireless interfaces, it is to be understood that a single mode device or a device that supports voice over a single wireless interface can also be utilized as the mobile unit.

The mobile unit 50 also includes a processor 60 that is programmed and configured to control operation of the mobile unit based upon executable instructions stored in associated memory 62. The memory 62 can include random access memory (RAM), read only memory (ROM), flash memory, or other type or combination of memory devices. The processor 60 can communicate with each of the interfaces 52 and 54 via a bus 64. The processor 60 can also retrieve and store data and instructions relative to the memory 62 over a data bus 64. Alternatively or additionally, the processor 60 may include cache or access other associated memory (not shown) directly for performing the call anchoring logic functions described herein as well as for performing and controlling other known functionality of the mobile unit 50.

According to an aspect of the invention, the memory 62 includes call anchoring logic 66 that is programmed to determine if predetermined criteria has been satisfied to require anchoring an outbound call from the mobile unit to the enterprise 52. The call anchoring logic 66, for example, can include instructions that define call anchoring criteria 70 that are executed by the processor 60 to control how an outbound call is made by the mobile unit. The processor 60, for example, can execute the call anchoring logic to apply the anchoring criteria 70 to call anchoring input data 68. The input data can be generated at the mobile unit 50, at the enterprise 52 (e.g., sent to the mobile unit via one or more of the wireless interfaces 54), or from a combination of the mobile unit and the enterprise.

As an example, some mobile units can employ wireless communication standards (e.g., 3G Global System for Mobile (GSM), Universal Mobile Telecommunications System (UMTS), 4G GSM and the like) can be employ wireless data protocols (e.g., General Packet Radio Service (GPRS), Enhanced Data rates for GSM Evolution (EDGE), Universal Mobile Telecommunications System (UMTS)) that permit concurrent voice and data over the same network. The combined voice and data allows the mobile unit 50 to receive various input data 68 over a corresponding data link prior to, concurrently with or after the outbound voice call has been initiated at the mobile unit. By receiving at least a portion of the input data 68 in advance or concurrently with the outbound voice call being initiated, the determination of whether or not to anchor the call by the call anchoring logic 66 can be facilitated. Additionally, or alternatively, a call can be placed from the mobile unit 50 to the enterprise 52 and DTMF signaling can be employed to receive call anchoring input data from the enterprise. Several examples of call anchoring criteria 70 and corresponding input data that can be utilized by the mobile unit 50 are provided herein (see, e.g., FIGS. 1 and 5 and the related description). For example, call anchoring can be conditioned on any one or more of the following: user input entered at the mobile unit (e.g., the dialed number or a manual user control); a condition of the enterprise (e.g., an equipment fault or failure at the enterprise); a location of the mobile unit, a cost associated with the outbound call; and predefined data associated with an intended recipient of the outbound call (e.g., whether a call anchoring has been set for the called party, such as in a field of a contact list or address book).

Based on the results of the determination, namely, whether call anchoring is required, the processor 60 can cause an interface control 72 to initiate the outbound call to the called party with call anchoring to the enterprise 52 or without call anchoring. The interface control 72 can be implemented as a process or a routine that is stored in the memory 62. The interface control 72 thus can be executed by the processor 60, such as part of calling software that controls operation of the wireless interfaces 54 and flow of data relative to the mobile unit 50. The interface control 72 can control the wireless interfaces 54, such as can be separate or concurrent operation of the interfaces.

The mobile unit 50 may also include a user interface 74 that can be employed by a user for interacting with the mobile unit 50. The user interface 74 can include an arrangement of graphical interface elements as well as buttons and other controls (e.g., knobs, dials and touch screen controls and the like) for implementing the various functions of the mobile unit 50. As one example, the user interface 74 can be utilized to manually control whether or not to require call anchoring for a call. Additionally or alternatively, the user interface 74 can also be utilized to program one or more of the criteria 70 employed by the call anchoring logic 66, such as described herein. Alternatively or additionally, the call anchoring logic 66 (or a portion thereof) can be programmed by an administration control process running on the enterprise 52. The enterprise can include a PSTN gateway 76 that can be connected to the network 56 via a suitable interface (e.g., primary rate interface (PRI)) or basic rate interface (BRI)). The enterprise can also include a PBX 80, such as an IP-PBX that affords VoIP communication over an associated data network. For example, the IP-PBX 80 can combine a VoIP gateway with traditional PBX functionality. The IP-PBX 80 can exist as a hardware object, or virtually, as a software system running in the enterprise 52.

The PBX 80 can perform any functionality of a typical PBX as well as provide for handoff of a call anchored within the enterprise between different radio technologies implemented at the mobile unit 50. Thus, IP-PBX 80 enables the enterprise to use a managed intranet to help reduce long distance expenses, enjoy the benefits of a single network for voice and data and advanced computer telephony integration features. As a further example, the PBX can be coupled to a server (e.g., a software object) that controls the handoff of calls between different wireless technologies such as between cellular and Wi-Fi networks. Thus, if call session is ongoing over the cellular interface and the call has been anchored within the enterprise, the enterprise network can transfer (e.g., hand off) the call from the cellular network to a VoIP call over a preferred enterprise data network after the Wi-Fi interface 54 of the mobile unit 50 has been authenticated in such network.

For instance, the second wireless interface 54 of the mobile unit 50 can authenticate with the enterprise, which is programmed to provide for VoIP over Wi-Fi via the second wireless interface 54 and corresponding resources in the enterprise network 52. To enable the handover to a different radio technology, the enterprise 52 also includes at least one wireless interface 78 that is compatible with at least one wireless interface 54 of the mobile unit 50. The IP-PBX 80 can be connected to the wireless interface 78. For instance, the wireless interface 78 can be implemented as part of a wireless access point or router that forms part of a wireless enterprise network. Examples of systems and methods that can be implemented to control handover for the mobile unit 50 are shown and described in U.S. patent application Ser. No. 11/778,831, which was filed on Jul. 17, 2007, and entitled SYSTEM AND METHOD TO FACILITATE HANDOVER, the specification of which is incorporated herein by reference.

Figure 3:
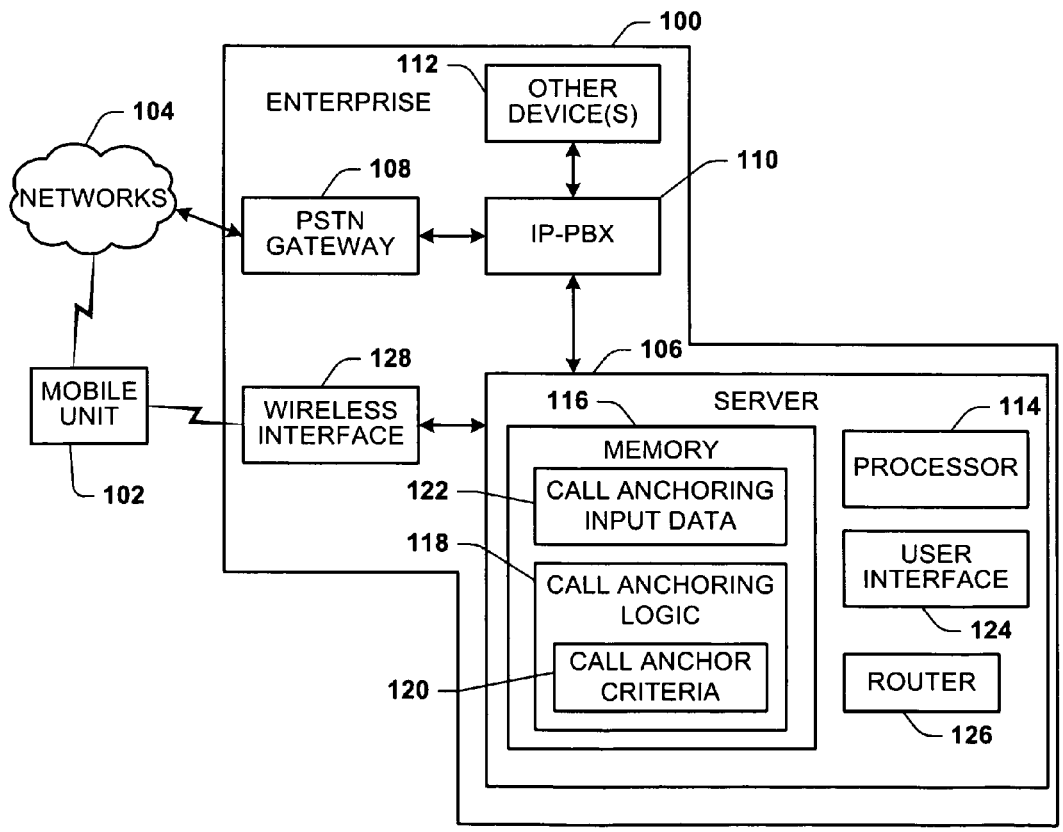
FIG. 3 depicts an example of an enterprise configured to perform dynamic call anchoring according to an aspect of the invention.

FIG. 3 depicts an example of a private network implemented as an enterprise 100 that is configured to determine whether or not to require anchoring of an outbound call placed from a mobile unit 102 within the enterprise. While the description of FIG. 3, for purposes of example, describes the private network as corresponding to an enterprise, it will be appreciated that similar functionality can be implemented other types of private network, such as described herein. The mobile unit 102 can be authenticated with the enterprise 100 such that data communication between the mobile unit and the enterprise can be enabled over one or more network, schematically indicated at 104. For example, the mobile unit 102 can support one or more wireless data communication protocol (e.g., GPRS, EDGE, EDGE Evolution, and the like) that can be utilized to connect to a server 106 within the enterprise 100. For instance, the data communication can be leveraged by the mobile unit to provide call data or other information relating to the outbound call from the mobile unit 102 to the enterprise 100. The data communication can also be utilized to provide control information from the enterprise 100 to the mobile unit 102 to cause the call to be initiated for anchoring within the enterprise, if required, or to cause the call to be initiated without anchoring. This communication of call anchoring data can occur prior to the call being initiated, concurrently with the initiation of the call, or after the call has been initiated, such as part of a background control process hidden from the user.

The enterprise 100 also includes a PSTN gateway 108 that in communication with the network 104, such as through a corresponding interface. For example, the interface can be in the form of a local loop that includes a plurality of telephone lines or an ISDN service, such as PRI/BRI, for providing a link between the enterprise and the PSTN gateway 108 for placing and receiving calls over the network 104. It is to be understood that the network 104 can represent the PSTN as well as one or more public land mobile network (PLMN) that is in communication with the PSTN. An IP-PBX 110 is connected with the PSTN gateway 108 and the server 106. The IP PBX 110 can define a node in the enterprise network 100. The IP-PBX 110 is programmed to performing switching functions, such as establishing, maintaining and disconnecting connections between legs of a call session. The PBX 110 can connect with another node in the enterprise (e.g., the PSTN gateway 108), the server 106 or one or more other devices 112 using an IP protocol. While the PSTN gateway 108 is illustrated within the enterprise, it will be understood that the PSTN gateway 108 may reside external to the enterprise 100. The other device(s) 112 may include one or more of a voice over IP (VoIP) telephony device (such as an IP telephone, IP fax machine, multi-media computer, media terminal adapter, analog terminal adapter, or other device) that is capable of communicating with the IP PBX 110 using an IP protocol.

Examples of IP protocols that can be utilized for initiating a communication session through the PBX 110 include H.323, session initiation protocol (SIP), each of which are well known, as well as the skinny client control protocol (SCCP) and skinny gateway control protocol (SGCP), which are protocols developed by Cisco. Using SIP, for instance, the mobile unit or an enterprise telephone station could send an IP-based SIP "INVITE" message to the IP PBX 110, in an effort to set up and anchor a call from the mobile unit 102, such as a call to another extension on the IP PBX 110 (e.g., one of the other devices 112) or a call to an outside telephone number via the PSTN gateway. The IP PBX 110 can also process and connect calls originating within the enterprise 100 to the called parties within the enterprise as well as called parties residing external to the enterprise via the PSTN gateway and the network 104. While the IP-PBX 110 and the PSTN gateway 108 are illustrated separate components, they may be integrated within the enterprise 100.

The server 106 is programmed with one or more applications to control mobility functions for mobile units 102 that are authenticated with the enterprise 100. As described herein, the mobile unit 102 can authenticate with the enterprise via a background process over a data network supported by the mobile unit. Additionally, or alternatively, DTMF signaling can be employed to send call anchoring input data from the mobile unit to the server 106. For example, the mobile unit 102 can call a predefined enterprise number for the server and providing DTMF encoded data to the server. The DTMF encoded data can be provided to the server 106 as part of the user-initiated outbound call being initiated at mobile unit or a separate background call initiated automatically.

The server 106 includes a processor 114 that is programmed and configured to control operation of the server 106 based upon executable instructions stored in associated memory 116. The memory 116 can include random access memory (RAM), read only memory (ROM), flash memory, or any other type or a combination of memory devices. The processor 114 can communicate through the IP PBX via signaling using a control protocol (e.g. SIP, SCCP or H.323). The processor 114 can also retrieve and store data and instructions relative to the memory 116. Alternatively or additionally, the processor 114 may include cache or access other associated memory (not shown) directly for performing the functions described herein as well as for performing and controlling other functionality.

According to an aspect of the invention, the memory 116 includes call anchoring logic 118 that is programmed to determine if predetermined criteria has been satisfied to require anchoring of an outbound call that has been placed from the mobile unit 102. The call anchoring logic 118, for example, can include instructions that define call anchoring criteria 120 that are executed by the processor 114 and applied to call anchoring input data 122. The input data 122 can be generated at the enterprise 100, at the mobile unit 102 (e.g., sent to the enterprise unit via a data network or DTMF signaling), or input data can represent information from both the mobile unit and the enterprise. The call anchoring logic 118 can provide an ANCHOR CONTROL signal to the mobile unit 102 that instructs the mobile unit dynamically to anchor the call if the outbound call is determined to require call anchoring. Alternatively, the anchor control logic 118 can issue an instruction to the mobile unit 102 to initiate the call without anchoring to enterprise, if the call anchoring criteria 120 and input data 122 indicate that anchoring is not required. Several examples of call anchoring criteria 120 and corresponding input data 122 that can be utilized by the call anchoring logic 118 for dynamically anchoring a call from the mobile unit are provided herein (see, e.g., FIGS. 1 and 5 and the related description). Briefly stated, the call anchoring criteria 120 can condition the call anchoring determination responsive to a combination of one or more of the following mechanisms: user input entered at the mobile unit (e.g., the dialed number or a manual user control); a condition of the enterprise (e.g., an equipment fault or failure at the enterprise); a location of the mobile unit, a cost associated with the outbound call; and predefined data associated with an intended recipient of the outbound call (e.g., whether a call anchoring has been set for the called party, such as in a field of a contact list or address book).

The server 106 can also include a user interface component 124 that can be utilized to program the call anchoring logic 118, such as by an administrator or other authorized user. The server 106 can also include a mobility router 126 that controls mobility functionality of mobile units for the enterprise 100. The mobility router 126, for example, can be programmed to control handover for a mobile unit from one radio technology to another different radio technology provided that the mobile unit that has been anchored at the IP PBX, such as through a wireless interface 128 with which the IP PBX 110 and the server 106 are connected in the enterprise network. The wireless interface 128 can be compatible with a wireless interface of the mobile unit 102. For instance, handover can be initiated in a manner disclosed in the above-incorporated U.S. patent application Ser. No. 11/778,831 or by other known or yet to be developed techniques.

Figure 4:
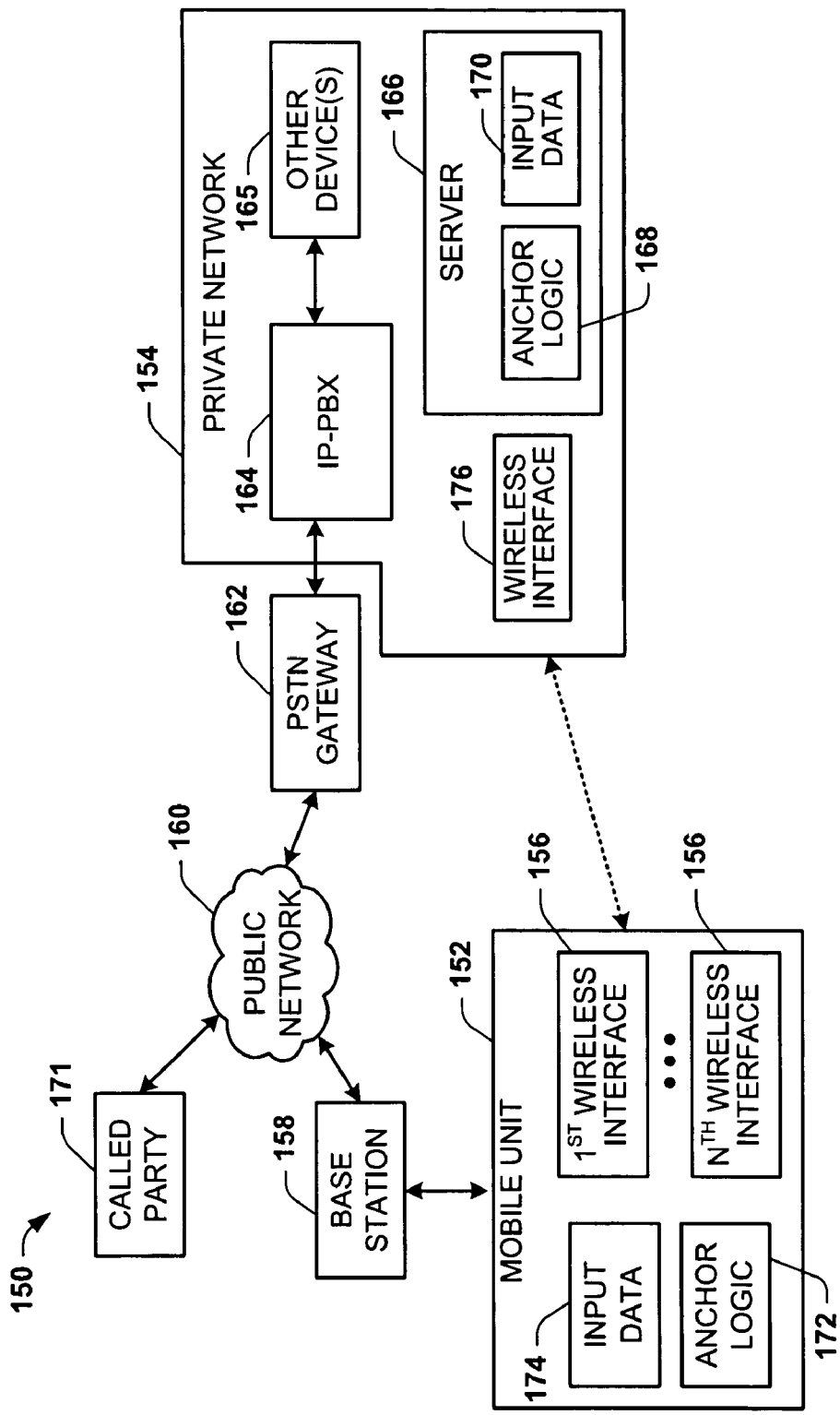
FIG. 4 depicts an example of a distributed system configured to perform dynamic call anchoring according to an aspect of the invention.

FIG. 4 depicts another system 150 to implement dynamic call anchoring according to an aspect of the invention. In the example of FIG. 4, call anchoring logic is distributed among a mobile unit 152 and a private network 154. Thus, the system 150 can be considered a hybrid or combination of the approaches disclosed with respect to FIGS. 2 and 3 where the determination as to whether to anchor a call from the mobile unit is made based on a cooperation or collaboration between the mobile unit and the private network (e.g., an enterprise or other network outside of the service provider network for the mobile unit 152). Accordingly, reference can be made back to FIGS. 2 and 3 for details about possible call anchoring functionality at each of the mobile unit and the private network.

As shown in FIG. 4, the mobile unit can be implemented as a multimode device that includes a plurality of wireless interfaces 156, indicated at $1^{st}$ wireless interface through an Nth wireless interface, where N denotes the number of wireless interfaces. Call anchoring can also be implemented for a single mode mobile unit or a multimode mobile unit that supports voice calls over a single wireless network. The mobile unit 152 is configured to communicate data and voice using one or more of the wireless interfaces 156. For example, the mobile unit can employ the $1^{st}$ wireless interface (e.g., a cellular interface) to connect wirelessly with an associated base station 158 of a cellular network using a corresponding wireless telecommunications protocol. The protocol can permit concurrent communication of voice and data, such as described herein. Another of the wireless transceivers (the Nth transceiver) 156 can employ a different radio technology from that implemented by the $1^{st}$ wireless transceiver, such as WLAN or WMAN or other protocol.

The base station 158 can communicate with a public network 160, such as may include one or more PLMN and/or PSTN, thereby providing a link to the public network 160 for the mobile unit 152 via the base station. The private network 154 is also coupled to the public network 160, such as via a gateway (e.g., a PSTN gateway) 162 that is configured to provide an interface between the private network and the public network. For instance, the private network 154 can include an IP-PBX 164 in communication with the gateway 162, such as via a plurality of telephone lines or an ISDN interface (e.g., PRI/BRI). The IP-PBX 164 can provide a variety of PBX functionality as well as communication using an IP protocol, including VoIP for devices residing in or anchored at an anchor point in the private network 154. One or more other device 165 can also be connected to the IP PBX, such as a VoIP telephony that is capable of communicating with the IP PBX 164 using an IP protocol.

The private network 154 can also include a server 166 that is programmed to control communication for devices and processes operating within the private network. According to an aspect of the invention, the server 166 can include one or more application components that define call anchor logic 168 programmed to determine whether or not a call from the mobile unit 152 should be anchored within the private network. The anchor logic 168 applies a set of anchor criteria to input data 170 to determine if anchoring of the outbound call from the mobile unit to the called party 171 requires anchoring (e.g., at the IP-PBX 164). Additionally, the mobile unit 152 also includes anchor logic 172 that applies a set of anchor criteria to input data 174 to determine if anchoring of the outbound call from the mobile unit requires anchoring at an anchor point residing within the private network 154. Thus, certain types of information can define the input data 174 that is evaluated by the anchor logic 172 residing at the mobile unit 152 to determine whether corresponding call anchor criteria has been satisfied and some types of information can define input data 170 that is evaluated by the anchor logic 168 residing in the private network 154 to determine whether corresponding call anchor criteria has been satisfied. The particular distribution of the various call anchoring criteria implemented and the type of information that is evaluated in each of the respective anchor logic 168 and 172 can vary according to application requirements and the availability of resources to perform the intended functions.

It will be appreciated that some types of information (e.g., information relating to the output call or to a called party 171, a condition of the call equipment for the private network, location data) can be transferred between the mobile unit 152 and the private network 154 for performing analysis of the respective call anchoring criteria. The results of the evaluation and analysis by the respective anchor logic 168 and 170 can be aggregated at the mobile unit 152 or at the private network 154 to determine whether to require call anchoring. The results further can be prioritized according to a predefined priority or weighting of the call anchoring criteria to control whether the outbound call from the mobile unit 154 is to be anchored. For example, in a situation where a higher priority criteria (e.g., a manual user control at the mobile unit or PBX failure at the private network) has been determined at one of the mobile unit 152 or the private network 154 to control call anchoring for an outbound call from the mobile unit, a corresponding message may be sent to the other component indicating the results of the determination. In this way, additional processing and analysis of the call anchoring criteria may not be required. As discussed above, certain types of input data (e.g., location information, rate plan information, failure of PBX equipment, manual control) can be stored in memory at the mobile unit and private network prior to the outbound call is initiated at the mobile unit 152. Other types of information (e.g., dialed number, analysis of dialed number, contact list control information) can be generated and stored as part a call of or in response to the user initiating the outbound call from the mobile unit 152.

As a further example, the private network 154 can also include any number of one or more wireless interfaces 176, such as in the form of wireless access points, which provide access to an internal network using an IP protocol. The wireless interface(s) 176 is compatible with at least one of the wireless interfaces of the mobile unit 152. As a result, the wireless interface can provide for voice and/or data communication between the mobile unit 152 and corresponding equipment in the private network 154 directly via a radio technology, such as Wi-Fi or WiMAX. Additionally, the server 166 can run one or more process to control substantially seamless roaming and handover of a call leg from an established anchor point between different radio technologies employed by the mobile unit. For example, if a cellular call from the mobile unit 152 has been anchored in the private network 154 (e.g., at the IP PBX 164), the server can cause the IP-PBX 164 to transfer an anchor point for the call to a new call leg that has been established between the private network and the mobile unit over a different radio technology (e.g., Wi-Fi or WiMAX). Examples of mechanisms that can be utilized to trigger the handoff between different radio technologies are disclosed in the above-incorporated U.S. patent application Ser. No. 11/778,831.

Figure 5:
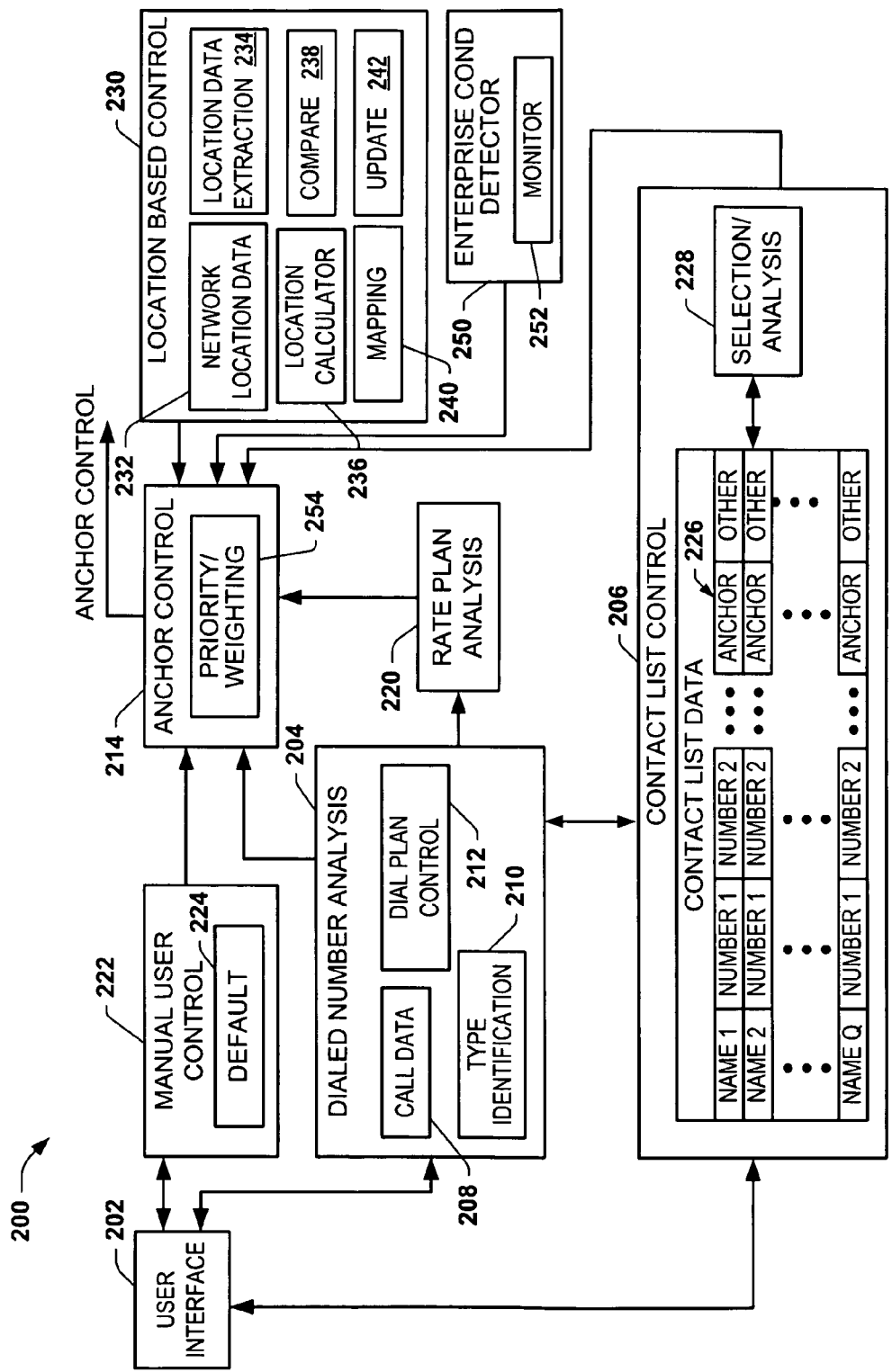
FIG. 5 depicts an example of functional block diagram of call anchoring logic that can be implemented according to an aspect of the invention.

FIG. 5 depicts a functional block diagram of call anchoring logic 200 that can be utilized to determine whether an outbound call from a mobile unit should be anchored within a private network. The call anchoring logic 200 is programmed to analyze one or more criteria or conditions of the mobile unit, an outbound call or an associated private network to determine if the outbound call should be anchored at an anchor point within the private network. The call anchoring logic 200 can be implemented as one or more software process residing at the mobile unit, at a server in the private network or distributed across the mobile unit and the private network.

A user interface (or other input mechanism) 202 can be utilized to program certain features or information utilized by the call anchoring logic 200. For purposes of simplicity of explanation, the user interface 202 can correspond to a user interface at the mobile unit, at the private network or at both the mobile unit and the private network.

As one example, the user interface 202 resides at the mobile unit and can be utilized to enter or select a dialed number for an outbound call. The user interface provides the dialed number to a dialed number analysis block 204. Additional information associated with the dialed number can also be provided, such as can be obtained from a contact list control block 206 based on the dialed number matching an existing entry in a contact list. The dialed number analysis block 204 stores the dialed number and the other information (if any) as call data 208. The other information in the call data 208, for example, can include a home area code, and a home international calling code for the mobile unit.

A type identification function 210 is programmed to analyze the call data 208 to determine what type of number has been dialed. The type identification function thus can provide an output having a value corresponding to a predefined type of number that can be dialed by the mobile unit. The output of the identification function can represent or identify the type or category of the dialed number or can simply indicate that the call should be anchored at the anchor point. The granularity of information can vary according to application requirements. As an example, the following is a list of some types of numbers that should be anchored in the private network: short digit dialing or extension dialing, enterprise numbers, international numbers, long distance numbers, and toll calls. These and other types of dialed numbers can be identified by the type identification function 210 based on the number of digits dialed, such as in the case of short digit and extension dialing. Other types of numbers may be identified according to an area code or international calling code provided in the call data 208. The results of the type identification function can be provided to an anchor control block 214.

By way of further example, when a user of a mobile unit is intending to dial another user whose device is in the private network, such as a PBX desk phone, there is no disadvantage to anchoring the call in the private network since that is where the called party is located. For instance, dial plan control 212 can recognize that short digit or extension dialing is utilized, such as based on information provided by the type identification function. The recognition can be based on the number of digits entered by the user at the mobile unit, for example. As a result, the dial plan control 212 enables the user to enter only 4 or 5 digits, for example, to connect to the desired party within the private network. If an enterprise number has been dialed by the mobile unit (either manually or in response to a selection from a contact list), the type identification function 210 can compare the dialed number against the enterprise dial plan, such as part of the dial plan control 212. For example, if all enterprise numbers start with 408-555-XXXX then the dialed number analysis can use this as a mask to determine if a portion of the dialed number (e.g., the first 6 digits) matches the mask and therefore require call anchoring.

When it has been determined (e.g., by the dialed number analysis block 204) that an enterprise number has been entered via the user interface 202 at the mobile unit, the dial plan control 212 (e.g., part of calling software running on the mobile unit) can in initiate the call to the PBX (e.g., via a predefined PBX access number stored in the dial plan control or other calling software). However, it will be appreciated that placing the call can also be contingent upon other anchor control mechanisms implemented by the call anchoring logic 200. For example, the anchor control component 214 can provide the ANCHOR CONTROL signal based on the output from the dialed number analysis block 204 and the outputs from other call anchoring criteria that may be implemented in the call anchoring logic 200. The ANCHOR CONTROL signal thus can control whether or not the outbound call from the mobile unit will be anchored based on an aggregate set of one or more call anchoring criteria. Once the mobile unit has been anchored in the PBX, the PBX can then connect the call to the called party, such as may reside within the private network, such as using the 4 or 5 digit number entered at the mobile unit, or external to the private network, such as in the case of a long distance or toll call.

It will be appreciated that a corporate PBX system often offers some savings to enterprises based on various call trunking configurations. For example, a company that has deployed an IP-PBX with multiple sites that span across long distance or international calling boundaries can realize tremendous cost saving by sending the calls via VoIP running over a corporate data network. Accordingly, when a user makes a cellular call from the mobile unit to such sites there can often be a long distance charge or an international charge. If the cellular call is anchored in the enterprise that is in the same calling area as the mobile device, however, only cellular air-time is charged, and no long distance or international charges may be incurred. Therefore, the type identification block 210 of the dialed number analysis block 204 can also be programmed to detect if a long distance, international or toll charge may be applied based on the call data 208. As one example, if the mobile device is configured with a home area code and a home country, simple digit analysis can be used to determine if the dialed number is a long distance call, a toll call or an international call. For instance, if the home area code is 408, then any other area code detected when a 10 digit call is made can require call anchoring. Likewise, if the home country code is 001 and any other country code is entered in the dialed number, the call can be anchored.

The call anchoring logic 200 may also include a rate plan analysis function 220 that is programmed to determine if anchoring the outbound call from the mobile is more cost effective than connecting the call without anchoring. The rate plan data can include rate plan information for the mobile unit and rate plan information associated with placing a call from within the private network. Thus, for a call placed to a given number (outside the private network) at a given time of day, the cost of anchoring the call and connecting to the called party from the network can be compared to placing the call without anchoring to ascertain the least expensive way to route the call. The results of the rate plan analysis function 220 can be provided to the anchor control based, at least in part, the anchor control signal can be generated.

The rate plan analysis function 220 can be provided call information from the dialed number analysis block 204, such as may include the dialed number from the call data 208 and the type of call being placed form the type identification function 210. This information thus can be evaluated relative to the rate plan information to determine if call anchoring should be required. The rate plan data utilized to determine the relative costs associated with different ways to place the call can be programmed by the user interface 202 at the mobile unit or by an administrator or other authorized user. For example, if the user has free mobile to mobile minutes or free nights and weekends, it might be cheaper to make the call directly (without anchoring) for situations when placing call directly affords free time or at a reduced cost. For example, if the user has free mobile to mobile minutes or free nights and weekends, it might be more cost effective to make the call direct (without anchoring) when calling a mobile call that affords such free minutes.

A manual user control 222 can be activated to manually, such as by the user interface 202 at the mobile unit, to require call anchoring or to inhibit call anchoring. The manual user control 222, for example, can include a default setting 224 that can be programmed (e.g., via the user interface 202) to normally require or prevent call anchoring depending on whichever is the most common scenario. If a common default is configured the end user only needs to manually make a selection when the common case is not required.

The option to manually require or prevent call anchoring may be needed, for example, in circumstances where the user wishes the call to remain private in the case where the owner of the private network is tracking all calls made via the private network. Additionally, a user may wish to present the cellular phone calling line identity to the called party instead of the calling line identity for calls placed from within the private network (e.g., an enterprise identity). As an example, prior to dialing the outbound call, the user employs a user interface 202 at the mobile unit to indicate whether or not a call should be anchored. The manual user control provides a corresponding output to the anchor control 214, which can be utilized (at least in part) to generate the ANCHOR CONTROL signal.

Many users may know a priori that a call to a given number or to a given contact should be either anchored or not anchored in the enterprise. For example, if an enterprise user calls a spouse or a relative there may be a desire to not route the call via the enterprise. This could be needed for privacy reasons, for example.

Accordingly, the contact list control 206 can include a field (an ANCHOR field) 226 for a given contact or a field for each respective telephone number that be programmed to indicate whether anchoring is required or not required for an outbound call to such contact or number. In the simplified example of FIG. 5, the contact list control 206 includes a selection/analysis component 228 that can evaluate the value of the anchor field 226 for a given contact or number to ascertain whether the outbound call should be anchored. For instance, most mobile devices today support some type of contact list on the device that can be expanded to support custom additions to a contact entry, such as the anchor control field 226.

By way of example, the user interface 202 can provide functionality (e.g., in the form of text, graphics or a combination thereof) to establish a list of telephone numbers or contacts that can be utilized in performing the dynamic anchoring process. The dynamic anchoring logic 200 can provide the ability to mark (e.g., via the user interface 202 at the mobile unit or other programming methods) a given contact or each telephone number for the given contact as either always requiring anchoring or never requiring anchoring. In either case, the selection/analysis component 228 can automatically inspect the contact list setting for a selected telephone number and cause the outbound call to be routed appropriately (e.g., anchored or not anchored) without intervention of the user. The results of analysis of the ANCHOR field (or fields) can be provided to the anchor control 214, which can be utilized (at least in part) to generate the ANCHOR CONTROL signal for ultimately controlling whether or not the call is anchored.

One of the reasons why a call may be anchored in an enterprise (or other private network) is for the purpose of seamlessly switching a VoIP call operating on the private enterprise network to a call operating on the PSTN or PLMN or vice versa. If this is the prime reason for anchoring calls then it makes little sense to anchor a call if the mobile user is not geographically located near the private enterprise network. It will further be understood that a given enterprise may include multiple physical locations, each having a corresponding local network. Thus, an enterprise can include multiple IP-PBXs that can be selectively utilized as an anchor point to anchor a call placed from a mobile unit within the enterprise based on dynamic call anchoring performed according to an aspect of the invention. To this end, the call anchoring logic 200 can include a location based control component 230 that is programmed to determine whether a call should be anchored based on a location of the mobile unit relative to the private enterprise.

By way of further example, the location based control component 230 includes network location data 232. The network location data 232 can include predefined location information that is associated with one or more geographical region or zone having a known geographical relationship with the private enterprise network. The network location data 232 thus can include a representation of information that can be compared relative to information acquired by the mobile unit to determine if the mobile unit resides in a pre-identified geographical region or zone that includes the preferred wireless network(s). This determination can be made by the location based control component 230 at the time the call is initiated or subsequently. The network location data 232 can be stored as a table, a list or other data structure (e.g., defining a map or footprint) that can be compared to location-identifying data, such as may be received via a corresponding wireless interface of the mobile unit. For example, location-identifying data for the mobile unit can be compared relative to the network location data 232 to ascertain whether the mobile unit is located within a footprint having a predefined relationship relative to the private enterprise network.

For the example of a cellular network, the location-identifying data for a mobile unit may include one or more cellular network parameter, such as a cellular identifier (cell ID) for cell base station, a location area code (LAC), and a sector ID. The particular scheme or format of such information and how such information is encoded in a cellular network may vary according to the scheme implemented by the carrier to which the cellular interface is designed to operate.

The set of cellular location-identifying parameters can be acquired by monitoring such information by one or more mobile device that travels through a wireless enterprise network. For example, one or more cell ID, LAC, and/or a sector ID can be identified for each access point of the preferred wireless network and stored in the network location data 110. Additionally or alternatively, the network location data 110 can be programmed based on a known set of such data, such as may be provided by the carrier or carriers that provide services for a given region or zone (e.g., from a comparison of a cellular coverage maps with the location of the access points in the wireless enterprise network).

For the example of a GPS network, the location-identifying data can correspond to a set or range of GPS coordinates that can be derived from GPS data. For example, the location data for one or more preferred wireless networks can be stored in the network location data 232 according to a known coordinate system, such as latitude/longitude, using the WGS 84 geodetic datum, or another local system that may vary from country to country.

The location based control component 230 can also include a location extractor 234 that is programmed to monitor or query location-identifying data for the mobile unit from one or more of the other (active) wireless interfaces, such as a cellular interface and/or other wireless interface. For the example of GSM cellular interface, the location extractor 234 can obtain an appropriate combination of one or more of the cell ID, LAC, and a sector ID that is received via the cellular interface of the mobile unit. For the example of GPS network, the location extractor 234 can obtain Coarse/Acquisition (C/A) code or, if available, the Precise (P) code from the interface. Alternatively, the location based control component 230 can be configured to compute coordinates, which coordinates can be obtained by the location data extractor 234.

A location calculator 236 can further determine an indication of the location from the extracted data, which can include conversion to a form consistent with the network location data 232. As described herein, the location can be the form of coordinates, or an identification of coverage area associated with a cellular base station or more general location area, such as may be defined by a LAC. It will be appreciated that any piece of such information that can be utilized to indicate a location of the mobile unit, such as within proximity of one or more preferred networks, can be utilized. A compare function 238 can also be implemented to ascertain whether the location determined by the location calculator 236 substantially matches at least one of the pre-programmed location-indicating data in the network location data 232. Alternatively, the compare function 238 can determine a match based on a comparison of the extracted parameter(s) relative to the pre-programmed data in the network location data 232. A match thus occurs when the mobile unit resides within a predetermined region, such as may be defined to contain one or more known wireless networks. In response to the compare function detecting such a match, a corresponding output signal can be provided to the anchor control 214 indicating that anchoring is required. The output from the location based control thus can be utilized (at least in part) by the anchor control 214 to generate the ANCHOR CONTROL signal.

As a further example, Table 1 depicts a possible set of location identifying data that can be stored in the network location data 232 for a cellular type of wireless network. From Table 1 it may be appreciated that a subset of such information can be utilized by the compare function 238 to determine whether the mobile unit is in proximity with the preferred wireless network(s). The particular set of information utilized may thus be programmed according to application requirements. Additionally, Table 1 might represent cellular location information for a given building that includes access points AP1, AP2, AP3, AP4 and AP5 in a multi-building enterprise. Accordingly, those skilled in the art will appreciate that the network location data 232 can be extended to accommodate different sizes and configurations of wireless networks and enterprises, which may include any number of wireless networks.

TABLE 1

| ACCESS POINT | CELL ID | LAC | SECTOR ID |
|---|---|---|---|
| AP1 | CID_2, CID_4 | LL5 | SS2 |
| AP2 | CID_2, CID_4, CID_5 | LL5 | SS3 |
| AP3 | CID_2, CID_4 | LL5 | SS2 |
| AP4 | CID_2, CID_3, CID_5 | LL5 | SS3 |
| AP5 | CID_2, CID_4, | LL5 | SS1 |

As described herein, the approach shown and described with respect to FIG. 5, for example, can be utilized to facilitate handover of a voice call, such as from the cellular interface (e.g., a traditional cellular call or a VoIP call over the cellular interface) to a Wi-Fi interface, such as a VoIP call over an associated wireless network (e.g., a trusted Wi-Fi Network). The handover can occur seamlessly to the user, such as in response to coordination between a PBX application in an enterprise server and corresponding client application program running on the mobile unit, such as set out in the above-incorporated U.S. patent application Ser. No. 11/778,831.

As yet another example, location-identifying parameters can be acquired by a mapping function 240 to identify the closeness of a mobile unit relative to the enterprise wireless network (e.g., WLAN) when making a call. The mapping of the enterprise WLAN to cellular LAC/cell ID can be learned automatically by a mobile unit that travels relative to the private enterprise network. The mobile unit periodically reports its WLAN connection state and surrounding cellular identifies to the enterprise server. If the mobile unit is connected on the enterprise WLAN and able to register with the enterprise server at the time the cellular measurement is taken, then the enterprise server knows the cellular identifiers indicate the cell towers are close to the private enterprise network. By receiving these measurements periodically from mobile units connected to the enterprise network the enterprise server is able to build a mapping of the cellular footprint surrounding the enterprise buildings and campuses. The resulting mapping can be stored as the network location data 232.

This automatic method is good for detecting the immediate surrounding cellular footprint, such as described above, but may not detect all cell identifiers where roaming might occur, such as along a commonly traveled path of the mobile unit that ends (or begins) within the private enterprise network. For example, a user might initiate a call from the mobile unit at home and drive several miles before reaching the enterprise network where a handover to the private enterprise network could occur. In this case, the call could have been anchored in the enterprise such that a seamless transition to the enterprise could occur after the mobile unit has reached a private wireless enterprise network. In certain situations, however, to accomplish this goal, the user's home would need to be programmed to qualify as being close enough to the enterprise or otherwise programmed as a call origination location that requires anchoring. A dynamic learning capability implemented by the location based control component 230 can be used to identify locations outside of the private enterprise network where call anchoring should be required.

For example, the mapping function 240 can track both the state of a call and the cellular identifiers it detects when making calls. If a call is initiated by the mobile unit on the cellular network and if the call is continuously connected until it reaches the private enterprise WLAN then it can be determined that the mobile unit has traveled along a cellular path where anchoring is required. In this case, by causing call anchoring for a call initiated anywhere along the cellular path, the anchoring would have enabled the possibility that the cellular call could have transitioned to the private enterprise network upon reaching a private wireless enterprise network. Once the mobile device learns this path exists, such as by storing a list of cell IDs or other network parameters along a path between a start of a call and reaching the local area for the private enterprise network, the mobile unit can reports the cellular identifiers that were detected along the path to the enterprise server. These identifiers and other information thus can be added to the list of identifiers that require anchoring, thereby forming part of the network location data 232. By using this method, star of cell identifiers can be created that covers a variety cases where mobile users can be anchored to the enterprise to enable a handover to a different wireless technology as it becomes available to the mobile unit within the private enterprise network.

The location based control component 230 can also include an update component 242 that is programmed to update the location parameters in the network location data 232. For example, the update component 242 can request a set of network location data from an application running on an enterprise server, such as through a wireless interfaces or through a physical connection, if available. Alternatively, the enterprise server can push the data to the mobile unit via the update component 242 in response to detecting that the mobile unit is connected with the server through one or more of its wireless interfaces. The amount of information sent to the mobile unit can vary depending on, for example, the size of the enterprise and the available memory for storing the network location data 232. For instance, a first enterprise may have relatively small number of access points at one more geographical locations or campuses, while another enterprise may include a vast number of access points spread across a multitude of campuses throughout the world. For the latter type of enterprise, the update control 242 can request an update for the network location data 232 for a set of one or more local campuses, such as may be determined by the enterprise server from location information sent with the request from the mobile unit. For instance, each campus can include a unique anchor point with a separate PBX or the private network can link the campuses through the use of a common distributed PBX system. Additionally, the set of network location data 232 can be customized for a given mobile unit so that a more relevant set of identifying data can be employed by the location based control component 230 in its determination on whether to anchor a call in the private enterprise network.

When call anchoring occurs there are additional hops in place that can result in a call not being connected if there is a failure in any of the nodes along the way. This can be a disadvantage since a call that would normally be anchored in the private enterprise network may not succeed if a failure in the enterprise equipment exists. For example, if the PBX had a catastrophic failure, such as a power outage, all mobile users currently in the cellular network could not make calls if they were being anchored on the PBX. It will be appreciated that failures on the enterprise side can occur on various network elements, such as a T1 or other PSTN connection, a voice gateway, or the PBX itself.

To accommodate such a failure or other conditions in enterprise equipment, the dynamic anchoring logic 200 thus can include an enterprise condition detector 250. The enterprise condition detector 250 can include a monitor 252 that is programmed to monitor one or more predetermined condition of the enterprise equipment that requires call anchoring be prevented. For example, the monitor function 252 can track status or results of diagnostic testing that is intermittently or periodically performed to verify the enterprise equipment is performing within expected operating parameters. Thus, in response to the detector 250 determining that an equipment failure or fault exists within the private enterprise network, such that a mobile unit would be unable to successfully anchor the call in the private network, the enterprise condition detector 250 can inform the anchor control 214 that call anchoring should be prevented. The anchor control 214 in turn can provide the ANCHOR CONTROL signal to cause the mobile unit to automatically route a call directly over a cellular without anchoring. The enterprise condition detector 250 can be programmed to differentiate an enterprise failure from a cellular network failure.

As discussed above, the anchor control 214 can provide an ANCHOR CONTROL signal based on the outputs from the various call anchoring criteria, including outputs from one or more of the manual user control 222, the dialed number analysis block 204, the contact list control 206, the rate plan analysis 220, the location based control 230 and the enterprise condition detector 250. It will be understood that the call anchoring logic 200 can be programmed to employ any combination of one or more such call anchoring criteria to control whether an outbound call from a given mobile unit will be anchored in the private enterprise network. The anchor control 214 further can employ a prioritization/weighting 254 to the outputs of the call anchoring criteria 204, 222, 220, 206, 230, and 250. The prioritization/weighting 254, for example, can assign an order of precedence for the call anchoring criteria 204, 222, 220, 206, 230, and 250 where multiple criteria are being used. For example, the enterprise condition detector 250 can have a highest precedence since detection of an enterprise failure an enterprise failure can prevent call anchoring to the private enterprise network. Similarly, the manual user control 222 can be set to anchor or not to anchor a call to override automatic call anchoring criteria, such as associated with the dialed number analysis 204, the contact list control 206, the rate plan analysis 220 and the location based control 230. As discussed above, the precedence implemented by the prioritization/weighting 254 of the call anchor control 214 can be programmable by a mobile user or an administrator in the private enterprise network.

Figure 6:
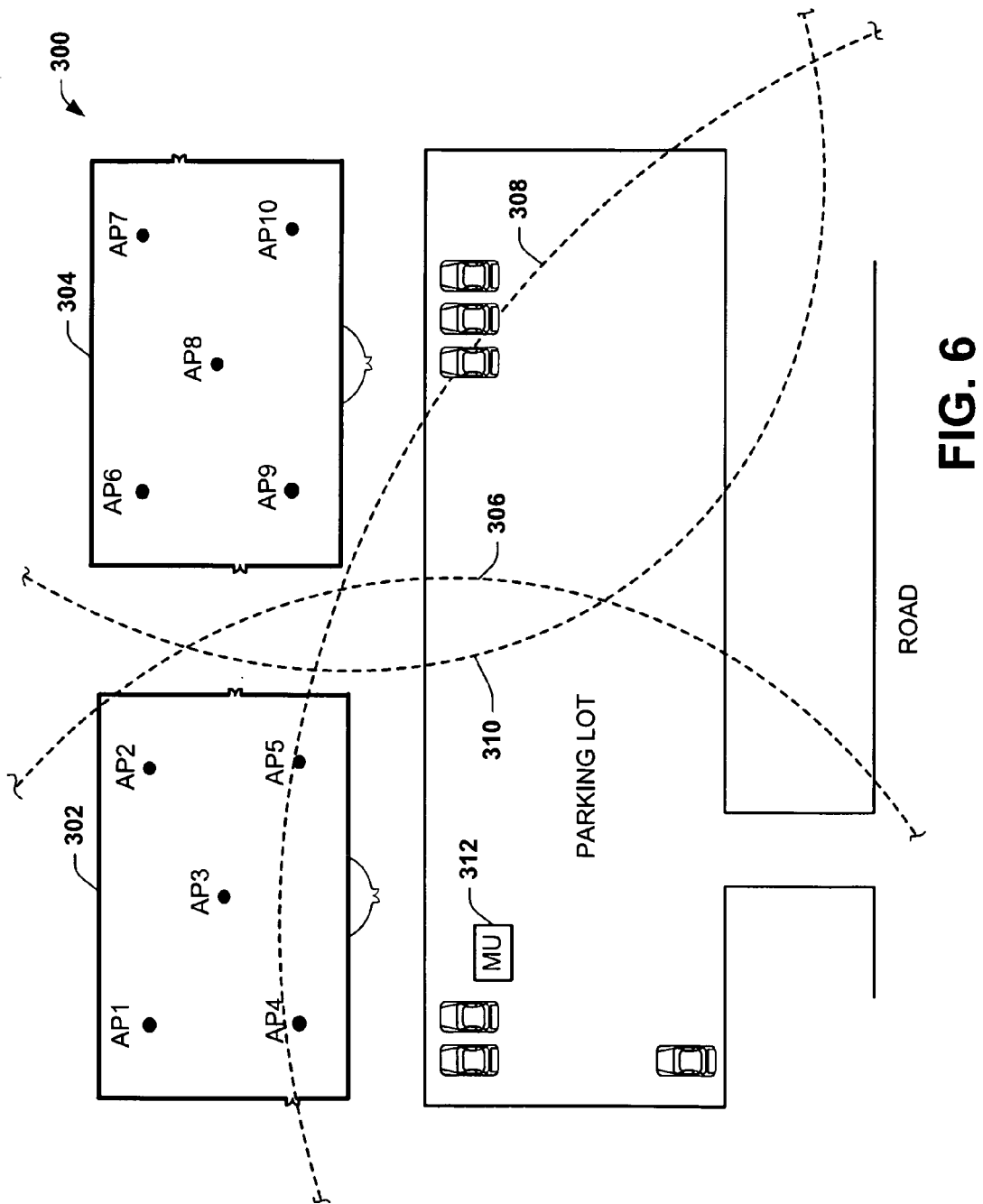
FIG. 6 depicts an example of a geographic region associated with an enterprise that can implement dynamic call anchoring according to an aspect of the invention.

As a further example of location based control that can be utilized as a means for performing dynamic call anchoring, FIG. 6 depicts an example of a given area 300 that can implement a local wireless network, such as a Wi-Fi or WiMAX network for a private network. In the example of FIG. 6, the area 300 is depicted as a campus that includes two buildings 302 and 304, each of which includes five access points having an aggregate coverage area which defines local networks that form at least a portion of an enterprise network or intranet. In particular, the building 302 includes a plurality of access points AP1, AP2, AP3, AP4 and AP5 and the other building 304 includes another plurality of access points AP6, AP7, AP8, AP9 and AP10, which wireless networks collectively define at least a portion of an enterprise network. Each building 302 and 304 can include one or more points of entry or egress through which mobile units may pass. Also depicted in FIG. 6 are three overlapping coverage areas 306, 308 and 310 for different cellular base stations or other base stations for networks that are wider than the local wireless network. Those skilled in the art will understand that the interrelationship between access points and coverage areas can vary according to the size and layout for a given area and further may include any number of separate wireless networks.

As described herein, a mobile unit 312 implemented according to an aspect of the invention can be dynamically anchored in the private network based on the application call anchoring criteria to a set of corresponding input data. In the example of FIG. 6, the call anchoring criteria is defined as the location of the mobile unit relative to the enterprise. For example, call anchoring logic can determine that call anchoring is required since the mobile unit is determined to be located within the coverage areas 306 and 308, which coverage area includes access points AP1, AP2, AP3, AP4 and AP5 of building 302. This determination can be made for example, based on a comparison of the Cell ID or LAC, GPS data or other location indicating information for the mobile unit relative to network location data, such as corresponding to a predefined enterprise map. As described herein, the call anchoring logic can reside in the mobile unit 312, in the private enterprise network or it can be distributed between the mobile unit and the enterprise equipment.

Figure 7:
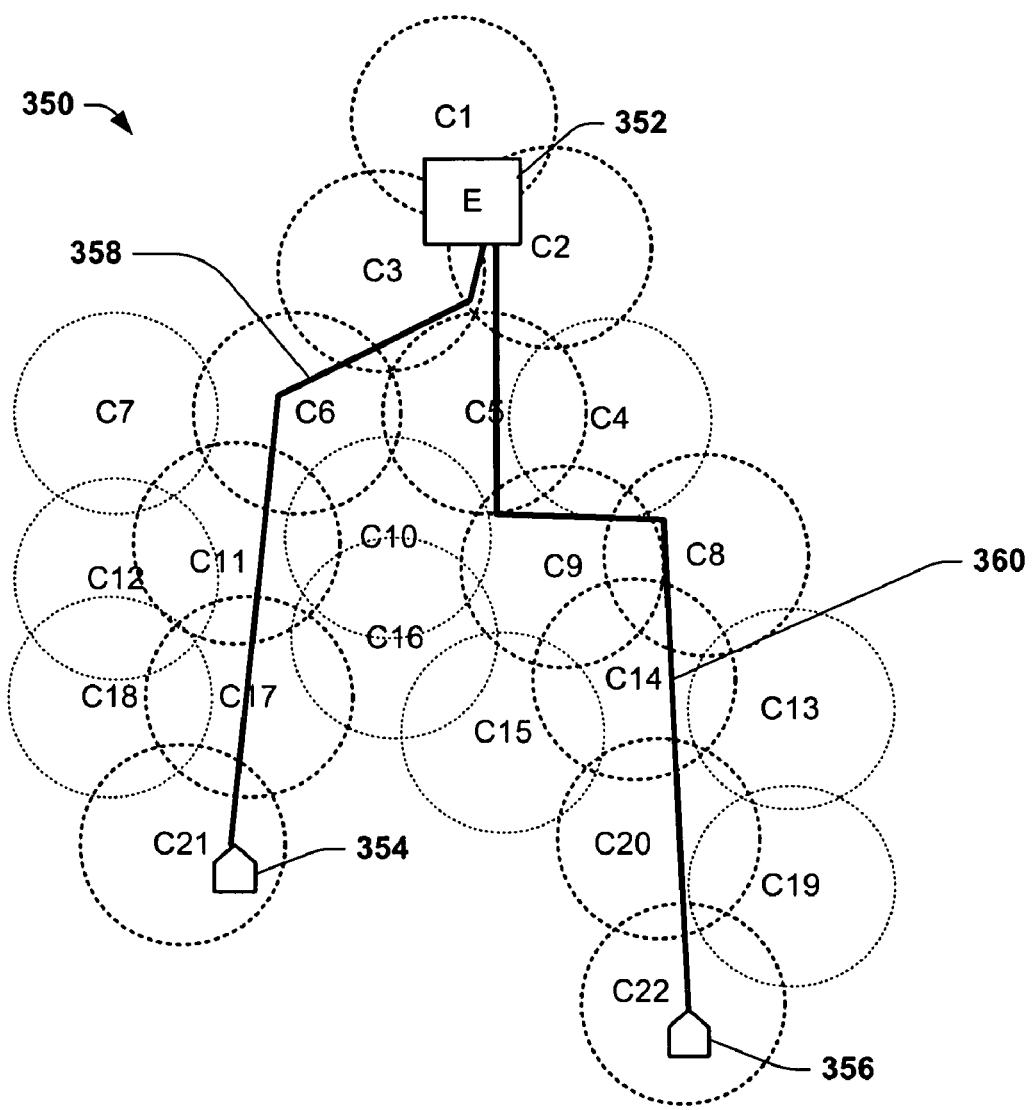
FIG. 7 an example of another geographic region associated with an enterprise that can be utilized for location based dynamic call anchoring according to an aspect of the invention.

FIG. 7 depicts another example of location based control that can be utilized as a means for performing dynamic call anchoring according to an aspect of the invention. In the example of FIG. 7 a partial coverage map 350, which includes the coverage area for a plurality of cell base stations or other types of wireless network (e.g., WiMAX), indicated at C1 through C22. Also depicted in FIG. 7 is an enterprise 352 to which any number of multimode mobile units can be authenticated. The enterprise 352 includes an enterprise network and employs an IP PBX, such as to support VoIP and other known PBX functionality, such as described herein. In the example of FIG. 7, two mobile users that are authenticated with the enterprise 352 have residences indicated at 354 and 356, which are located in coverage areas C21 and C22, respectively. Thus, the location based dynamic call anchoring can be programmed to require call anchoring of call placed by a mobile unit located in either of the coverage areas C21 and C22. Automatically anchoring calls placed from the mobile users' residence provides access to a variety of enterprise PBX functionality, including enterprise voice mail, transferring calls, and call conferencing to name a few.

A path of travel (e.g., a series of one or more roads) 358 connects the residence 354 and the enterprise 352. Similarly, another path of travel 360 connects the residence 356 with the enterprise 352. Each path of travel 358 and 360 can represent a typical route that an employee may take for a commute to and/or from a place of employment corresponding to the enterprise 352. It will be appreciated that there can be any number of one or more such paths that can be mapped for any number of mobile users, which can include a variety of alternative routes as can vary according to traffic considerations.

The path of travel 358 intersects a plurality of coverage areas from the residence 354 to the enterprise 352, namely, coverage areas C21, C17, C11, C6, C3 and C2. Similarly, the path 360 intersects coverage areas C22, C20, C14, C8, C9, C5 and C2. The location based control (e.g., control 230 of FIG. 5) thus can be programmed to require call anchoring if a call is initiated from a mobile unit that is located in coverage area along any of the paths 358 and 360. As described herein, the cell ID, LAC or other network identifiers can be obtained from a plurality of mobile units according to process running in the mobile unit that tracking the call state and the cellular identifiers that are detected while calls are made. Thus if a call is started along a path and is continuously connected until the mobile unit reaches the enterprise, then a cellular path that requires call anchoring can be defined for the mobile unit. Those skilled in the art will understand and appreciate that the determination that a cellular path exists can be made by the mobile unit or a process running in an enterprise server. Additionally, the enterprise server can store a complete set of cellular paths and other network location data (e.g., a master list) for controlling location based dynamic call anchoring. The location based control thus can be performed by dynamic call anchoring logic residing in the enterprise. Alternatively, cellular path data and other network location data can be selectively sent to each mobile unit for performing dynamic call anchoring.

Figure 8:
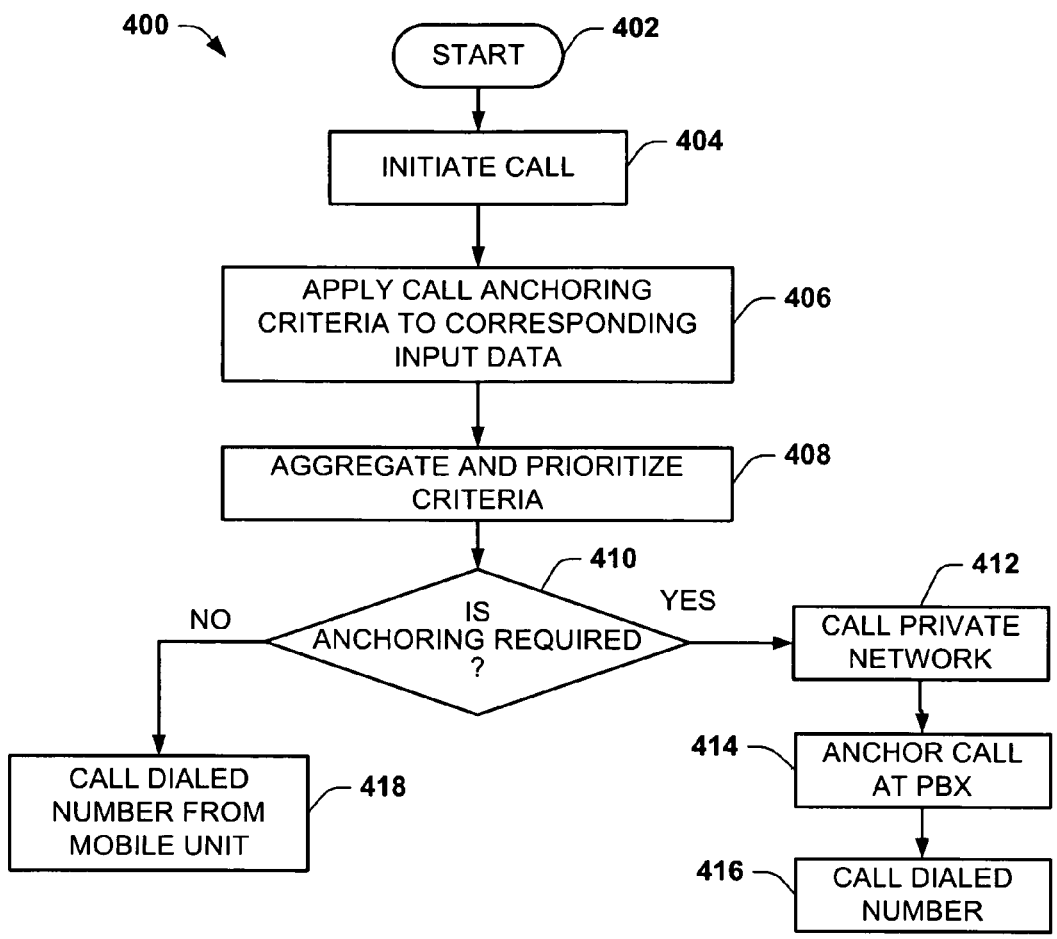
FIG. 8 is a flow diagram of method that can be implemented to dynamically anchor a call from a mobile unit according to an aspect of the invention.

In view of the structural and functional features described above, certain methods will be better appreciated with reference to FIG. 8. It is to be understood and appreciated that the illustrated actions, in other embodiments, may occur in different orders or concurrently with other actions. Moreover, not all features illustrated in FIG. 8 may be required to implement a method according to the subject invention. It is to be further understood that the following methodology can be implemented in hardware (e.g., one or more processors, such as in a computer or a processor based device or appliance), software (e.g., stored in a computer readable medium or as executable instructions running on one or more processors), or as a combination of hardware and software. Additionally, as described herein the method can be performed by such hardware and/or software in a mobile unit, in an enterprise server or the method can be distributed between the mobile unit and a private enterprise network. While the example of FIG. 8 is described with respect to an enterprise and its associated network, it will be understood and appreciated that the method can be utilized for dynamic call anchoring relative to any type of private network located and/or operating outside of the service provider network (e.g., a cellular network) for the mobile unit. Thus, the dynamic anchoring is performed with respect to equipment that is outside the control of the network service provider, even though one or more call leg from the mobile unit can use the service provider network.

The method 400 begins at 402 such as in conjunction with a mobile unit being powered up and connected to a wireless network such as a cellular telephone network. Additionally, at 402, information about the condition or state of the mobile unit can be acquired and stored in suitable memory accessible by the device or devices implementing the method 400. Additional information associated with a condition of the private network to which the mobile unit is authenticated can also be obtained and stored in the memory. Such information can vary and be updated intermittently. For example, the mobile unit can communicate with the private network via a data network, such as over a cellular network or other wireless network that can be utilized to provide access to the private enterprise network.

At 404, an outbound voice call is initiated at the mobile unit. This can trigger activation of call anchoring logic. The call anchoring logic can be programmed to evaluate any number of one or more call anchoring criteria. At 406, the programmed call anchoring criteria is applied to corresponding input data. As described herein, examples of call anchoring criteria and corresponding input data can involve any of the following: user input entered at the mobile unit (e.g., the dialed number or a manual user control); a condition of the private network (e.g., an equipment fault or failure at an enterprise); a location of the mobile unit, a cost associated with the outbound call; and predefined data associated with an intended recipient of the outbound call (e.g., whether a call anchoring has been set for the called party, such as in a field of a contact list or address book).

At 408, assuming multiple criteria are applied to determine whether or not to anchor the outbound call, the results of the criteria can be aggregated and prioritized. At 410, a determination is made (e.g., at the private network or mobile unit) to determine if anchoring is required. A resulting call anchoring control signal can be provided. If call anchoring has been determined to be required, the method proceeds to 412 in which the private network is called from the mobile unit (e.g., via a private enterprise access number). At 414, in response to the call from the mobile unit, the private network can place a call to the dialed number. At 416, the point at which the two call legs meet defines an anchor point in the private network (e.g., in an enterprise PBX or other equipment). In this way a two-stage call is established with call legs from the user to the PBX and from the PBX to the call party, which may reside in the private network or be a party external to the private network.

While the call is anchored in a PBX, traditional PBX functionality can be made available to the mobile user. Additionally, if the user enters into an wireless network (WLAN or WMAN) within the private network, a network server (if desirable) can establish another call leg between the mobile user and the private network over a different radio technology to which the call can be seamlessly handed off, such as described herein.

If at 410, it is determined that anchoring is not required, the method proceeds to 418 in which the mobile unit calls the dialed number directly without anchoring the call in the private network.

It is to be understood that the approach described herein is not limited to use with any particular standard. That is, the dynamic call anchoring shown and described herein is applicable to existing standards, to evolving as well as to new standards being developed.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A system for dynamically anchoring a call initiated by a mobile unit, comprising:
    at least one processor comprising call anchor logic, the call anchor logic comprising machine readable instructions executed by the at least one processor, the call anchor logic being programmed with anchoring criteria to determine if an outbound call being initiated from the mobile unit should be anchored at an anchor point corresponding to a predetermined Internet Protocol (IP) private branch exchange (PBX) outside of a service provider network for the mobile unit based on application of the anchoring criteria to input data, the call anchor logic providing an anchor control signal to cause the outbound call to be one of (i) anchored at the anchor point and (ii) connected to a called party without anchoring at the anchor point, the call anchor logic further comprising a location based control component programmed to determine if anchoring of the outbound call is required based on location-identifying data for the mobile unit, the location-identifying data for the mobile unit defining at least a portion of the input data, the anchor control signal being provided based at least in part on the location-identifying data for the mobile unit; and memory that stores the input data, the memory being accessible by the processor to execute the machine readable instructions.

2. The system of claim 1, wherein the mobile unit is configured to communicate using at least two radio technologies, the mobile unit employing one of the at least two radio technologies to initiate the outbound call based on the anchor control signal.

3. The system of claim 2, wherein at least a portion of the call anchor logic and the processor reside in the mobile unit.

4. The system of claim 2, wherein the call anchor logic resides in the mobile unit as the machine readable instructions, the input data comprising at least one of a user input entered at the mobile unit, an input associated with a condition of a private network in which the anchor point resides, data indicative of a location of the mobile unit, a cost associated with the outbound call, and predefined data associated with an intended recipient of the outbound call.

5. The system of claim 2, wherein a private network containing the anchor point is configured to communicate using at least one first communication technology that is the same as one of the at least two radio technologies used by the mobile unit and at least one second communication technology.

6. The system of claim 5, wherein at least a portion of the call anchor logic resides in the private network, the anchoring criteria comprising at least one of a user input to the mobile unit, an input from the private network and an input derived by the mobile unit.

7. The system of claim 6, wherein the call anchor logic causes the outbound call from the mobile unit to be anchored at the anchor point using at least one of the first communication technology and the second communication technology.

8. The system of claim 6, wherein the private network comprises equipment configured to connect to and maintain a call connection with the mobile unit that includes the anchor point, the private network being programmed to handover the outbound call from the mobile unit that was initiated over the one of the at least two radio technologies by establishing a new anchor point within the private network that includes a call leg between the mobile unit and the private network over a different one of the at least two radio technologies used by the mobile unit.

9. The system of claim 1, further comprising a user interface configured to receive a dialed number for the outbound call from the mobile unit, the dialed number defining at least a portion of the anchoring criteria, and wherein the call anchor logic further comprises a dialed number analysis component programmed to analyze the dialed number to determine whether or not the outbound call should be anchored, the anchor control signal being provided based at least in part on the analysis of the dialed number.

10. The system of claim 1, wherein the call anchor logic further comprises a contact list control component that is programmed to analyze predefined anchor data that is associated with stored contact data for the called party, the anchor control signal being provided based at least in part on the analysis of the predefined anchor data.

11. The system of claim 1, wherein the call anchor logic further comprises an network condition detector that is programmed to detect at least one condition of equipment in a private network containing the anchor point, the anchor control signal being provided to prohibit anchoring the call within the private network based on the at least one condition of the equipment in the private network.

12. The system of claim 1, further comprising network location data stored in memory to define at least one pre-identified area for which anchoring has been determined to be required for the mobile unit, the location based control component being programmed to compare the location-identifying data for the mobile unit with the network location data, the anchor control signal being provided based at least in part on the comparison of the location-identifying data with the network location data.

13. The system of claim 12, wherein the network location data is programmable to define the at least one pre-identified area based on network information received by the mobile unit during a call session to define a network path along which the mobile unit has been determined to travel to reach a predetermined location for the private network containing the anchor point.

14. The system of claim 1, further comprising a manual control configured to override the anchoring criteria and selectively cause the outbound call to be one of (i) anchored at the anchor point and (ii) connected to a called party without anchoring at the anchor point.

15. The system of claim 1, wherein the outbound call to the called party has a first identity of the mobile unit presented to the called party if the call is anchored at the anchor point and a second identity of the mobile unit presented to the called party within the service provider network for the mobile unit if the call not anchored in the private network.

16. The system of claim 1, wherein the call anchor logic employs a plurality of the anchoring criteria that are applied to respective input data to determine whether anchoring is required for the outbound call from the mobile unit, the call anchor logic further comprising an anchor control that aggregates results from application of the plurality of the anchoring criteria to the respective input data to provide the anchor control signal.

17. The system of claim 1, wherein the mobile unit further comprises a radio interface configured to communicate using a single radio technology, the mobile unit employing the single radio technology to initiate the outbound call based on the anchor control signal.

18. A non-transitory computer readable medium configured to implement a method for controlling anchoring of an outbound call from a mobile unit within a predetermined private network that is different from a service provider network for the mobile unit, the method comprising:

applying preprogrammed call anchoring criteria to corresponding input data to determine whether anchoring is required for the outbound call from the mobile unit;

automatically controlling the mobile unit to (i) initiate the outbound call to the predetermined private network so as to be anchored within the predetermined private network and connected to a called party in response to a first application of the preprogrammed call anchoring criteria;

automatically controlling the mobile unit to (ii) initiate the outbound call to the called party without anchoring within the predetermined private network in response to a second application of the preprogrammed call anchoring criteria;

manually overriding the automatically controlling the mobile unit to initiate the outbound call to the private network so as to be anchored within the predetermined private network and connected with the called party in response to a user input; and manually overriding the automatically controlling the mobile unit to initiate the outbound call to the called party without anchoring within the predetermined private network in response to the user input.

19. The medium of claim 18, the method further comprising:
analyzing a dialed number for the called party to identify a type or category for the dialed number; and
requiring that the outbound call be anchored in the private network based on the type or category of the dialed number.

20. The medium of claim 18, the method further comprising:
analyzing at least one field of an entry in a contact list corresponding to the called party; and
requiring that the outbound call be anchored in the private network based on a value of the at least one field.

21. The medium of claim 18, the method further comprising:
detecting a condition of equipment operating within the private network; and
requiring that the outbound call be connected to the called party without anchoring if the detected condition indicates a failure of the equipment.

22. The medium of claim 18, the method further comprising
determining a location of the mobile unit;
comparing the location of the mobile unit with predefined network location data;
wherein automatically controlling the mobile unit causes the mobile unit to anchor the outbound call in the private network based on the comparison of the location of the mobile unit with the predefined network location data.

23. The medium of claim 22, the method further comprising programming the predefined network location data responsive to network data detected by the mobile unit as the mobile unit travels relative to the private network.

24. A method for anchoring a call from a mobile unit at an anchor point corresponding to an Internet Protocol (IP)-based private branch exchange (PBX) located in a private network coexisting external to a service provider network for the mobile unit, the method comprising:
initiating the call from the mobile unit to a dialed number for a called party;
applying call anchoring criteria, which includes location data, to a set of input data, which includes location-identifying data for the mobile unit, to determine if anchoring the call from the mobile unit is required based at least in part on comparing the network location data to the location identifying data for the mobile unit;
anchoring the call at the anchor point in the private network if the application of the call anchoring criteria indicates that anchoring of the call is required; and
connecting the call to the called party without anchoring the call in the private network if the application of the call anchoring criteria indicates that anchoring of the call is prohibited.

25. The method of claim 24, wherein the call anchoring criteria further comprises at least one of an analysis of the dialed number, a condition of equipment operating in the private network, an analysis of rate plan data for the mobile unit and with the private network, and an analysis of contact list data associated with the called party.

26. The method of claim 24, wherein after the call from the mobile unit has been anchored in the private network, the method further comprises transferring a leg of the call from a first radio technology over with the call has been initiated at the mobile unit to a new call leg established between the mobile unit and the private network using a second radio technology to define a second corresponding anchor point for the call, the second corresponding anchor point being within the private network.

27. The method of claim 24, further comprising aggregating results from each of a plurality of the call anchoring criteria to determine if the call anchoring is required.

28. A mobile unit, comprising:
a first wireless interface configured to provide for bidirectional communication over a first radio technology;
a second wireless interface configured to provide for bidirectional communication over a second radio technology, the first radio technology being different from the second radio technology;
a processor controlling operation of the first wireless interface and the second wireless interface, the processor executing instructions to perform a method of dynamically controlling whether a call initiated using the first wireless interface requires anchoring in an associated private network, the method comprising:
applying call anchoring criteria, which includes predefined location data, to determine whether anchoring the call from the mobile unit is required based at least in part on comparing the predefined location data to data representing a location of the mobile unit;
calling an access number for the private network using the first wireless interface to anchor the call at an anchor point corresponding to an Internet Protocol (IP)-based private branch exchange (PBX) in the associated private network if the application of the call anchoring criteria indicates that anchoring of the call is required; and
connecting the call to the called party without anchoring the call in the associated private network if the application of the call anchoring criteria indicates that anchoring of the call is one of not required and prohibited.

29. A private network comprising:
an internet protocol private branch exchange (IP PBX) in communication with a public network through a gateway, the IP PBX defining a node in the private network;
a server programmed to perform a method of dynamically controlling anchoring within the private network of a call from an authorized mobile unit to a called party, the method comprising:
causing the authorized mobile unit to anchor the call in the private network if application of anchoring criteria to variable input data indicates that call anchoring is required for the call based at least in part on location-identifying data for the authorized mobile unit, the location-identifying data for the authorized mobile unit defining at least a portion of the variable input data; and
causing the authorized mobile unit to connect the call to the called party directly without anchoring within the private network if the application of anchoring criteria to variable input data indicates that the call anchoring is one of prohibited or not required for the call.

30. A non-transitory computer readable medium that stores machine readable instructions, which when executed by a processor, are configured to cause an outbound call to be dynamically anchored within a private network for connecting to a called party if decision logic determines that at least one preprogrammed criteria indicates that the outbound call is to be anchored within the private network, the decision logic causing the outbound call to be directly connected to the called party without anchoring if the at least one preprogrammed criteria indicates that anchoring of the outbound call within the private network is prohibited, the private network being accessible from and operating outside a service provider network, and wherein the outbound call to the called party has a first identity of the mobile unit, which is presented to the called party, if the call is anchored at the anchor point and a second identity of the mobile unit within the service provider network for the mobile unit, which is presented to the called party, if the call is not anchored in the private network.

31. The non-transitory computer readable medium of claim 30, wherein the machine readable instructions are further programmed to override the at least one preprogrammed criteria and selectively cause the outbound call to be one of (i) anchored at the anchor point and (ii) connected to a called party without anchoring at the anchor point.

32. The non-transitory computer readable medium of claim 30, wherein the at least one preprogrammed criteria further comprises at least one of an analysis of dialed number for the outbound call, a condition of equipment operating in the private network, an analysis of rate plan data for the mobile unit and with the private network, and an analysis of contact list data associated with the called party.

* * * * *